United States Patent [19]

Fishman

[11] Patent Number: 5,017,799
[45] Date of Patent: May 21, 1991

[54] AUTOMATIC POWER SUPPLY LOAD SHEDDING TECHNIQUES

[75] Inventor: David A. Fishman, Lakewood, N.J.

[73] Assignee: AT&T Bell Laboratories, Murray Hill, N.J.

[21] Appl. No.: 374,674

[22] Filed: Jun. 30, 1989

[51] Int. Cl.$^5$ .................. H02J 1/14; H04M 19/00
[52] U.S. Cl. .................................. 307/34; 307/35; 379/324
[58] Field of Search ............. 307/2, 29, 31, 35, 38–41, 307/115, 130, 131, 33, 34; 379/2, 186, 307, 322–324, 412, 413; 340/310 A, 310 R, 825, 825.06, 825.07, 825.08, 825.16, 825.22; 364/138–142, 492, 493; 455/3, 4, 620; 375/36

[56] References Cited

U.S. PATENT DOCUMENTS

| 4,464,724 | 8/1984 | Gurr et al. | 364/492 |
| 4,593,272 | 6/1986 | Berkowitz | 340/500 |
| 4,639,609 | 1/1987 | Floyd et al. | 307/10.1 |
| 4,819,180 | 4/1989 | Hedman et al. | 364/492 |

Primary Examiner—J. R. Scott
Assistant Examiner—David Osborn
Attorney, Agent, or Firm—David R. Padnes

[57] ABSTRACT

Reducing the power consumption of loads fed by one or more power supplies is achieved by the use of apparatus which determines the power supply output and, upon the occurrence of a predetermined condition, generates a signal to the power-consuming loads. In response to this signal, the loads alter their mode of operation so as to reduce the overall demand on the power supply. Several implementations of this load-shedding technique, which is particularly suitable for use in a communications system, are disclosed.

10 Claims, 4 Drawing Sheets

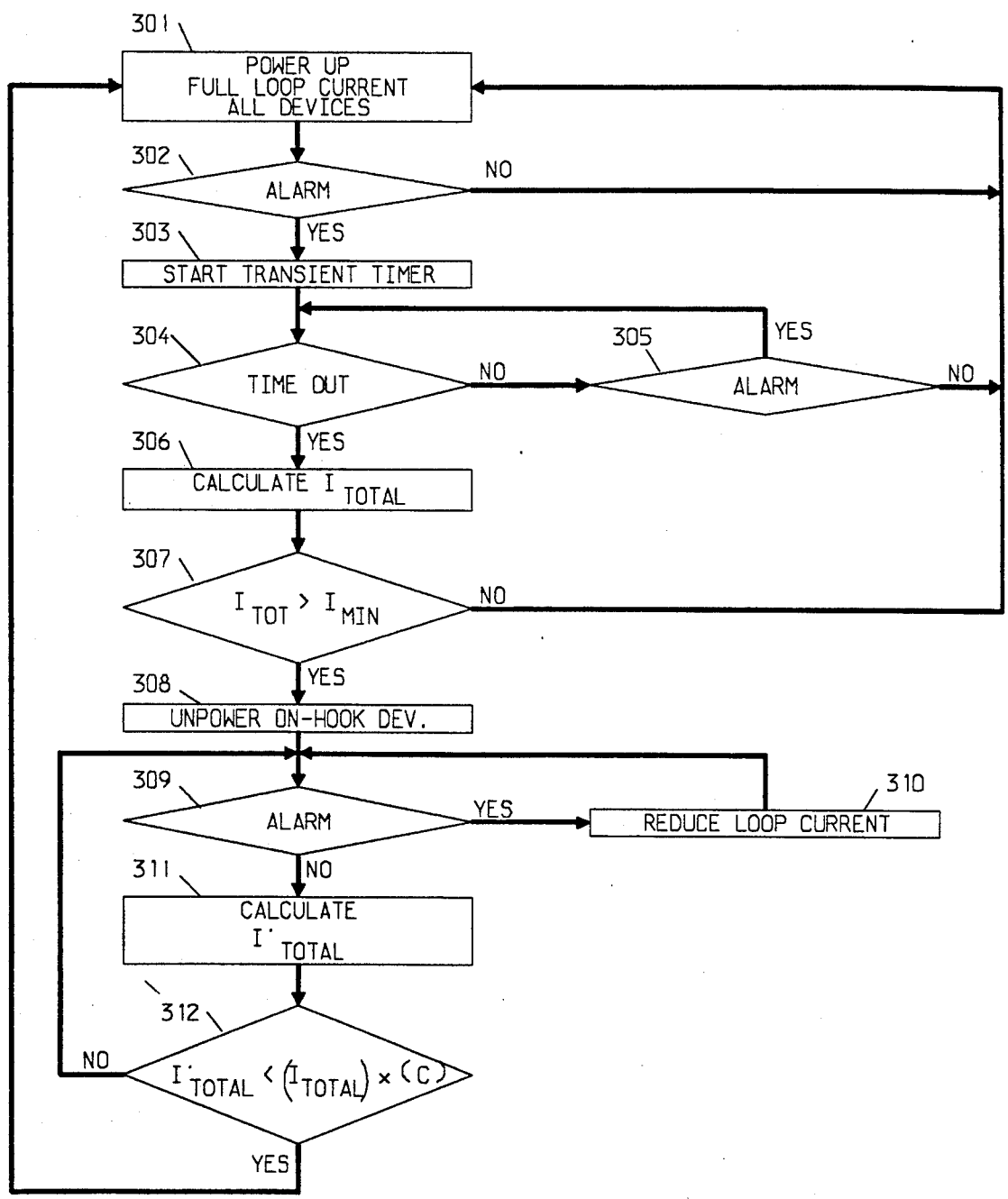

FIG. 4

| DEVICE MANAGEMENT FORM | | |
|---|---|---|
| DEVICE __2000__ | DEVICE TYPE _7103__ | PORT __11016 |
| 401 | 402 | 403 |

| DEVICE POWER FORM | | |
|---|---|---|
| DEVICE TYPE | ON-HOOK CURRENT DEMAND (502) | OFF-HOOK CURRENT DEMAND (503) |
| 2500 | 0 A | 0.05A |
| 7103 | 0 | 0.05 |
| 7403D | 0.03 | 0.05 |
| 7404D | 0.025 | 0.03 |
| 7405D | 0.05 | 0.075 |
| 7407D | 0 | 0 |
| 7410D | 0.025 | 0.05 |
| --- | --- | --- |
| POWER SUPPLY | TOTAL AVAILABLE DEVICE CURRENT (TAI) — 501 | |
| CARRIER 1 | 8 A | |

| CURRENT DEMAND SPREADSHEET IN SYSTEM MEMORY | | | | |
|---|---|---|---|---|
| PORT CARD $PC_m$ | COMMUNICATIONS DEVICE J | DEVICE TYPE | DEVICE STATUS | POWER SUPPLY CURRENT DEMAND TDI |
| 1 | 1 | 2500 | OFF-HOOK | 0.05 A |
| 1 | 2 | 2500 | OFF-HOOK | 0.10 A |
| --- | --- | --- | --- | 0.90 A |
| 1 | J | 7103 | ON-HOOK | 0.90 A |
| 2 | 1 | 7403D | UNPLUGGED | 0.90 A |
| 2 | 2 | 7405D | OFF-HOOK | 0.975 A |
| --- | --- | --- | --- | 2.5 A |
| 2 | J | 7410D | OFF-HOOK | 2.55 A |
| --- | --- | --- | --- | --- |
| --- | --- | --- | --- | 5.0 A |
| M | 1 | 7407D | OFF-HOOK | 5.0 A |
| M | 2 | 7404D | ON-HOOK | 5.025 A |
| --- | --- | --- | --- | 6.0 A |
| M | J | 7410D | OFF-HOOK | 6.05 A |

600

AUTOMATIC POWER SUPPLY LOAD SHEDDING TECHNIQUES

TECHNICAL FIELD

The present invention pertains to power supplies and, more particularly, to techniques for reducing the power demand on such supplies upon the occurrence of a predetermined event so as to maintain a certain level of load operation.

BACKGROUND OF THE INVENTION

Power supplies are used to supply power to power-consuming loads. "Load shedding" is a term which refers to reducing the power demands on a power supply upon the occurrence of a predetermined condition. Preferably, such load shedding should be accomplished in a manner which maintains, if at all possible, some minimum acceptable level of load operation.

In electric utility companies, load conditions are commonly sensed and, upon the occurrence of some maximum demand level, the power generating equipment of the utility company reduces its output voltage level to avoid damage to such equipment and power distribution network extending therefrom. This technique has long provided satisfactory results but is not applicable to certain power supply applications. For example, in certain systems, the automatic reduction of the power output by the supply may render the supplied loads inoperative or can suddenly reduce their performance to an unacceptable level. One example of such an application is in a communications system wherein such reduction can cause a complete or significant loss of communications capabilities.

Communications equipment is often designed with one or more power supplies which feed a number of power-consuming communications loads. The capacity of such supplies is generally determined upon initial system design to supply sufficient power for the intended loads. However, with time, the communications capabilities of such systems are typically expanded which, in turn, are often accompanied by a substantial increase in the demand placed upon the power supply. Indeed, the increased demand may, at times, exceed the maximum capabilities of the initially-sized power supply. To avoid this result, the initially installed power supply can be designed with a power capability far in excess of that initially required. This approach, while acceptable from a performance standpoint, results in an increased communications system cost which may exceed system objectives. Another approach is to retrofit a larger capacity power supply into a communications system when increased communications capabilities are added and the power demand approaches or exceeds that of the installed power supply. The problem with this approach is that the retrofit of a larger capacity power supply may not be possible due to size constraints, or the resulting heat transfer requirements of the larger supply cannot be provided by the existing equipment housing, or the retrofit is expensive and requires rendering the communications system inoperable for an undesirable length of time.

SUMMARY OF THE INVENTION

In its broadest aspect, the present invention relates to a load-shedding technique wherein monitoring apparatus determines the output demand on a power supply and, upon the occurrence of a predetermined condition, generates a signal to the power-consuming loads fed by the supply. This signal, in turn, causes the loads to change their mode of operation so as to reduce the overall power demand placed on the power supply. Advantageously, this technique, which locates the load-shedding apparatus external to the power supply, can be achieved with software or hardware-based implementations.

In the disclosed embodiments, a power supply feeds at least one load in a communications system and the monitoring apparatus is located within the load or outside the load in a central processor complex which controls the overall operation of the communications system or in the power supply itself. Upon the occurrence of a predetermined condition, the power supply output demand determining apparatus causes one or more loads to alter their mode of operation so as to reduce their power consumption.

An advantage of the present invention is that it can be implemented to provide a gradual shedding of load.

Another advantage of the present invention is that it can reduce initial system cost by permitting a smaller capacity power supply to provide average power demand capabilities. Above average power consumption can then be provided with a minimum reduction in communications capability by load shedding.

BRIEF DESCRIPTION OF THE DRAWING

FIG. 3 is a flow-chart which illustrates the operations of microprocessor 115 of FIG. 1 in accordance with a second embodiment of the present invention;

FIGS. 4, 5 and 6 are tables which illustratively depict data stored in memory 102 and utilized in a third embodiment of the present invention.

DETAILED DESCRIPTION

Figure 1:
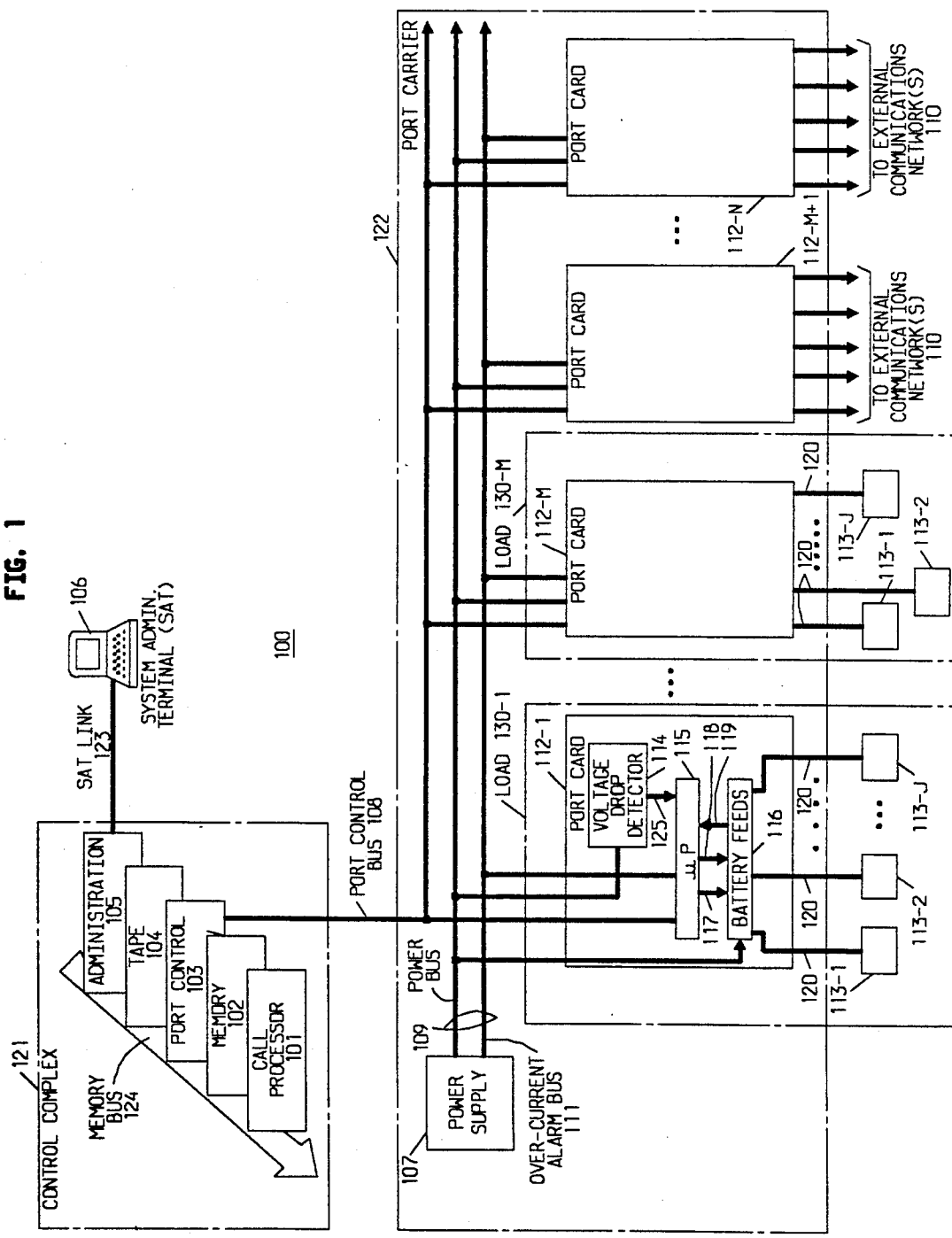
FIG. 1 is a block-schematic diagram of an illustrative communications system which utilizes various alternative embodiments of the present invention.

The present invention can be implemented in a variety of power supply applications. FIG. 1 shows one such power supply application which is in an illustrative communications system. The illustrative communications system in this application is a Private Branch Exchange (PBX) 100 wherein a power supply 107 supplies power to a plurality of loads 130-1 through 130-M. Each load includes a different one of port cards 112-1 through 112-M and the directly connected or associated communications devices 113-1 through 113-J. As will be described hereinbelow, in the disclosed embodiments, the output demand of power supply 107 is determined and upon detecting a predetermined condition, some or all of the loads alter their mode of operation so as to reduce the power demand. Specifically, in the disclosed embodiments, such operational mode alteration is accomplished by reducing the total loop current supplied to the associated communications devices. PBX 100 provides communications capability between a plurality of communications devices 113-1 to 113-J and between one or more such devices and one or more external communications networks 110. Networks 110 may be public networks, private networks, or both and may include other PBXs so as to provide a network of interconnected PBXs. The communications devices, which include station sets, personal computers, video terminals, environmental sensing devices, such as smoke and fire detectors, facsimile machines, etc. The number of such devices per port card may be fixed for each of the M port cards or can vary from port card to port card. External communications networks 110 are connected to the PBX via port cards 112-(M+1) through 112-N and the number of such port cards providing a network interface is typically less than the number of port cards providing an interface to communications devices 113-1 through 113-J. While not shown in FIG. 1, PBX 100 can also include port cards which interface apparatus which provide special service circuits, such as announcement or recorded message capability, etc.

PBX 100 also encompasses a control complex 121 which is connected to port carrier 122 via port control bus 108. The control complex includes a call processor 101, memory circuitry 102, port control circuitry 103, tape unit 104 and administration interface circuit 105. Call processor 101 controls the communications capabilities provided by the PBX using software and data stored in memory circuitry 102. Bidirectional communications capability between the call processor and the port carrier via port control bus 108 is provided by port control circuitry 103. Tape unit 104 provides a mass storage capability for system administration data which is inputted via system administration terminal (SAT) 106 and coupled therefrom through SAT link 123 administration interface circuit 105.

In the illustrative PBX, port carrier 122 houses power supply 107 and the plurality of port cards 112-1 through 112-N. Power is coupled from power supply 107 to each port card by power bus 109. Power supply 107 provides a constant voltage with the current varying with the number of powered devices and the signaling and communications capabilities being provided. Advantageously, power bus 109 includes an overcurrent alarm lead 111 which is coupled to each port card and indicates when the current output of supply 107 exceeds a predetermined level. As will be discussed, lead 111 is utilized in one embodiment of the present invention. Of course, while only one power supply 107 and one port carrier 122 are shown in FIG. 1, PXB 100 may include a plurality of power supplies and port carriers which are connected in parallel to control complex 121.

Each of port cards 112-1 through 112-M includes circuitry to interface with one or more communications devices and such circuitry includes battery feeds 116, microprocessor ($\mu$P) 115 and voltage drop detector 114. The $\mu$P controls each of the battery feeds via leads 117-119 and communicates with voltage drop detector 114, which monitors changes in the voltage on power bus 109, port control bus 108 and overcurrent alarm lead 111. The $\mu$P interface to battery feed 116 encompasses three functions. The first function is battery feed current limit control which limits the maximum loop current drawn by the communications device and is coupled from the $\mu$P to each battery feed by a signal on lead 117. Such current limit control can be accomplished in a variety of well-known ways. For example, the value of a resistor in a battery feed dc feedback loop can be altered to limit the maximum current on lead 120. The second function is feed shutdown control which prohibits any loop current being provided to any communications device and is provided by another signal conducted by lead 118 from the $\mu$P to the battery feed. The third function is feed status. Feed status indicates the activity state, e.g., active, inactive or "unplugged" or inoperable, of each communications device and is indicated by signals coupled on lead 119. For example, an activity state of "off-hook" indicates that a communications device is active or in use while an "on-hook" status indicates that a device is inactive and not in use. Some communications devices draw loop current only in the off-hook state while others draw loop current in either the off-hook or on-hook state.

Load shedding becomes necessary when a power supply overload condition is present. In the illustrative PBX system, load shedding is accomplished by reducing the loop current provided by a battery feed to its communications devices to a predetermined level. Several methods of providing this load shedding in accordance with the present invention will now be discussed. For purposes of illustration, load shedding will be discussed in terms of reducing the current drawn by the communications devices connected to port cards 112-1 through 112-M. Similar techniques could be applied to reducing the current drawn by the other port cards 112-M+1 through 112-N.

The following methods are suitable for port cards 112-1 through 112-M which interface communications devices that demand maximum current while in the off-hook state and less than maximum or no current while in the on-hook state. It is also assumed that the power supply is designed to supply the powering requirements for all devices when they are on-hook. Hence, load shedding will only be required during high traffic conditions when many devices are off-hook thereby increasing the demand for current from the power supply.

In two of the illustrative methods, the port card microprocessor 115 requires certain data constants to implement the load shedding techniques. These constants can be fixed in a ROM connected to the $\mu$P or, for greater flexibility, be alterable in a RAM associated with the $\mu$P. Both the ROM and RAM are not shown in FIG. 1, for purposes of simplicity, as the operation of such memory devices with a $\mu$P is well-known. If a RAM is used, the stored constants would be changed in well-known fashion via data entered through SAT terminal 106.

The first method to be discussed utilizes each $\mu$P 115 to determine if load shedding is required by monitoring the number of associated communications devices which are off-hook via the signal on lead 119. The associated communications devices are those which are connected to the port card on which the $\mu$P is located. The advantage of this first method is its simplicity and relatively low cost. The disadvantage, however, is that it assumes that the different port cards 112-1 through 112-M have approximately the same current requirements as a function of time. This is so because the $\mu$P does not monitor the power supply, but instead each $\mu$P tracks the number of associated communications devices which are off-hook and makes a decision based on the number of associated off-hook devices without regard to the load requirements of the other port cards.

Figure 2:
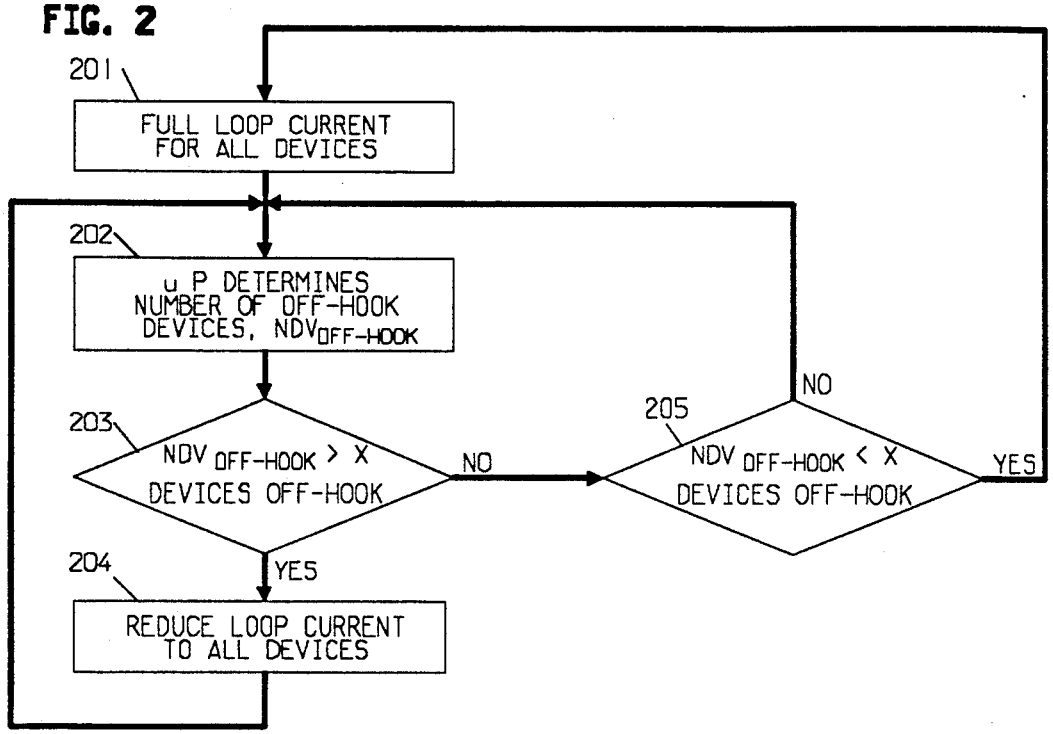
FIG. 2 is a flow-chart which illustrates the operations of microprocessor 115 of FIG. 1 in accordance with a first embodiment of the present invention.

FIG. 2 shows the sequence of steps, designated as 201 to 205, performed by each $\mu$P 115 in determining whether to shed load based on the number of off-hook communications devices, designated as $NDV_{OFF\text{-}HOOK}$. The value of threshold constant X in steps 203 and 205 is a predetermined quantity and is a function of the capacity of power supply 107, the number of port cards and communications devices supplied by the power supply and the full loop current available for the communications devices. Specifically, X, i.e., the threshold value for the number of off-hook associated communications devices required to initiate load shedding, is determined by $$X = \frac{TAI_{OFF\text{-}HOOK}}{(NPC)(I\Delta_{OFF\text{-}HOOK})} \quad (1)$$

where $TAI_{OFF\text{-}HOOK}$ is the total available power supply current for all off-hook devices and is equal to the total power supply current minus the total current required for all on-hook communications devices;

NPC is the number of port cards supplied by the power supply; and $I\Delta_{OFF\text{-}HOOK}$ is the difference between on-hook and full loop, off-hook current for each associated communications device.

Once a μP 115 has determined to shed load, it continues in a loop through steps 202-204 until $NDV_{OFF\text{-}HOOK}$ is not greater than X as indicated by step 203. Advantageously, the first embodiment incorporates hysteresis so as to minimize the likelihood of undesirable on-off cycling of load shedding. Specifically, if $NDV_{OFF\text{-}HOOK}$ is also less than X as indicated by step 205, full loop current is restored to all associated off-hook communications devices as indicated by step 201.

A numerical example of this first embodiment of the present invention will now be presented. Suppose that the available power supply current to power all off-hook communications devices connected to port carrier 122 is 8 amps, i.e., $TAI_{OFF\text{-}HOOK}=8$, the power supply powers 20 port cards (NPC=20) and $I\Delta_{OFF\text{-}HOOK}$ is 50 milliamps per communications device. Using equation (1) above, X=8. Therefore, no more than 8 associated communications devices may be off-hook at full-loop current and only if less than 8 such devices are off-hook is full-loop current supplied to all these devices. In other words, load shedding is initiated when 9 or more communications devices are off-hook and is suspended when 7 or less communications devices are off-hook.

The second technique for shedding load, in accordance with the present invention, monitors the power supply to determine whether to initiate load shedding. Consequently, it is particularly advantageous to implement where the load of each port card can be significantly different from one another at any time.

Refer now to FIG. 3 which shows the sequence of operations performed by each μP 115 to implement the second technique. The initial conditions, as indicated by operation 301, are that the PBX is operative and full loop current is supplied to all communications devices. The detection of an alarm condition, as indicated by step 302, can occur through either of two alternatives. In the first alternative, each μP monitors overcurrent alarm lead 111 to determine the existence of an alarm while, in the second alternative, voltage detector 114 senses a drop in the voltage on power bus 109 and the existence of such a drop indicates an alarm condition and is communicated to each μP 115 via lead 125 in FIG. 1. In either alternative, once an alarm condition is detected, the μP preferably activates a timer, indicated by operation 303, which runs so long as the alarm condition persists. If and only if the alarm condition persists for more than a predetermined time, as indicated by a "yes" output from conditional step 304, does the process proceed to operation 306. The use of a timer advantageously ignores momentary overloads, such as a surge caused by the insertion of a port card into an operating PBX. If the alarm does not persist for the predetermined time period, full loop current condition is provided to all communications devices in operation 301 following a "no" result of operations 304 and 305.

Operation 306 determines the total current, designated as $I_{TOTAL}$, being consumed by the associated communications devices, and stores it for hysteresis use. $I_{TOTAL}$ is governed by the following relationship:

$$I_{TOTAL}=(NDV_{ON\text{-}HOOK})(I_{ON\text{-}HOOK})+(NDV_{OFF\text{-}HOOK})(I_{OFF\text{-}HOOK}) \quad (2)$$

where $NDV_{ON\text{-}HOOK}$ is the number of associated communications devices that are on-hook;

$I_{ON\text{-}HOOK}$ is the loop current drawn by an on-hook device;

$NDV_{OFF\text{-}HOOK}$ is the number of associated communications devices that are off-hook; and $I_{OFF\text{-}HOOK}$ is the full loop current drawn by an off-hook device.

In operation 307, the μP compares $I_{TOTAL}$ to $I_{MIN}$, the current drawn by the associated communications devices when they are all on-hook, and where $$I_{MIN}=(NDV_{ALL})(I_{ON\text{-}HOOK}) \quad (3)$$

and $NDV_{ALL}$ is the total number of communications devices associated with a port card, i.e., the number off-hook, on-hook and unplugged.

If $I_{TOTAL}$ is not greater than $I_{MIN}$ on a port card, no load shedding will be initiated. This operation is included as it may generally be assumed that the power supply is designed to handle the load of a port card when all the associated communications devices are on-hook. Accordingly, if $I_{TOTAL}$ is not greater than $I_{MIN}$ for a particular port card, the power supply overload is not caused by a condition on that port card and no load shedding on that port card is necessary.

Operations 308-310 perform the initial load shedding which excludes any power being supplied to the associated on-hook communications devices while maintaining full loop current to all the associated off-hook communications devices. As indicated by operations 309 and 310, if the alarm condition still exists, the loop current supplied to the off-hook communications devices is gradually reduced until the alarm condition ceases and the μP determines the new current demand, designated as $I'_{TOTAL}$. In operation 311, $I'_{TOTAL}$ is determined in the same manner as $I_{TOTAL}$ in equation (2). Advantageously, the operations of FIG. 3 incorporate hysteresis, as indicated by operation 312, by requiring that $I'_{TOTAL}$ be less than some predetermined fractional constant (C) of $I_{TOTAL}$, e.g., 75%, before repowering on-hook devices and supplying the off-hook devices with full loop current in operation 301.

As a numerical example of this second embodiment, suppose that $I_{ON\text{-}HOOK}=25$ milliamps, $I_{OFF\text{-}HOOK}=50$ milliamps, $NDV_{ON\text{-}HOOK}$ and $NDV_{OFF\text{-}HOOK}$ both equal to 8 communications devices during an alarm condition. Therefore, $I_{TOTAL}=0.75$ and, assuming C=0.75, $I'_{TOTAL}$ must be less than 0.56 amps before load shedding ceases and full loop current is restored.

It should be appreciated that while hysteresis has been implemented using operation 312, other methods are also possible. For example, the power supply overcurrent alarm lead 111 can couple a three-state signal which indicates start load-shedding, stop load-shedding and resume full loop current.

While the previous methods pertained to automatic load shedding techniques that did not involve any interaction with the control complex 121, other than the possible inputting of data, the last technique for load shedding in accordance with the present invention utilizes a system level approach.

In the third embodiment, SAT 106 provides a systems management interface through which information pertaining to all of the systems components can be entered for use by call processor 101. In addition, the entered information can be used to generate system management forms. For example, for each of communications devices 113-1 through 113-J installed on the port cards 112-1 through 112-M, one system management form, designated as device management form 400, as shown in FIG. 4, is generated. Form 400 includes fields 401–403 which respectively indicate the device designation, the device type and the associated port. As an example, in FIG. 4, a device designated in the PBX as device 2000 is of the 7103 type. The associated port number is 11016. The first digit (1) indicates that it is supplied by power supply number 1, the next two digits (10) indicate that the referenced device is associated with port card 10 and the last two digits (16) indicate that battery feed 16 on the associated port card supplies loop current.

Another system management form generated by data entered through SAT terminal 106 is device power form 500, shown in FIG. 5. This form contains the total available current, designated as 501 and defined as the maximum output current rating for power supply 107. Form 500 also includes the on-hook and off-hook current demands for each communications device, which are respectively designated as 502 and 503, for each device type.

Figure 7:
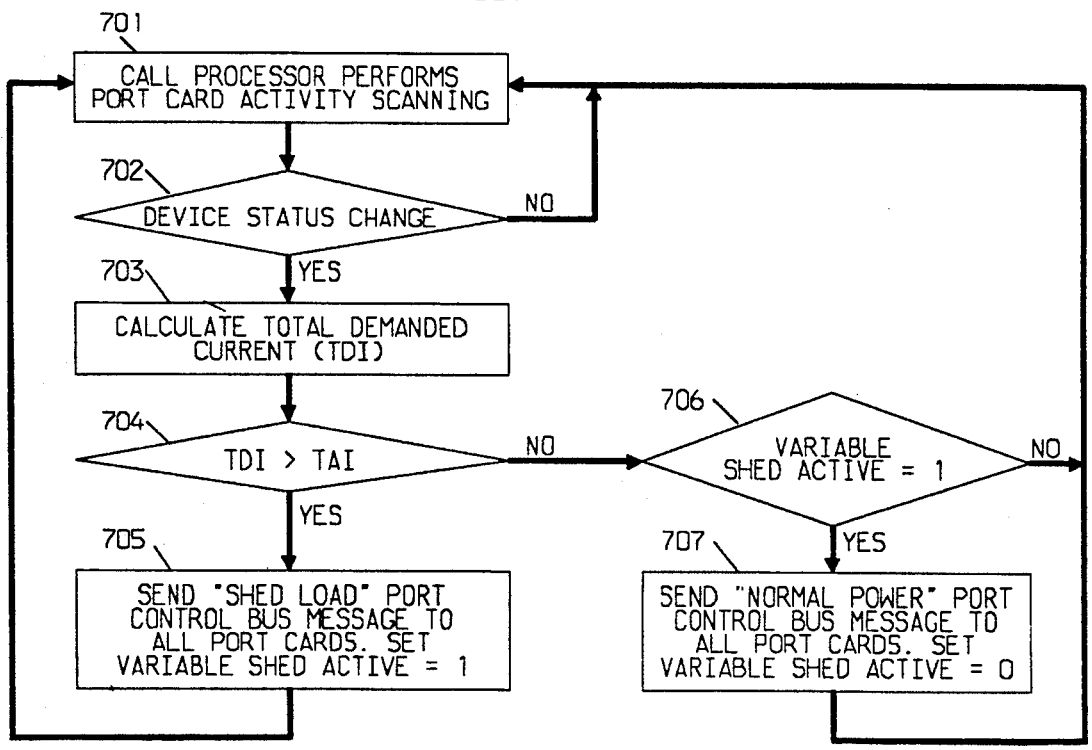
FIG. 7 is a flow-chart of the operations performed by call processor 101 in accordance with the third embodiment of the present invention.

FIG. 7 shows the operations of call processor 101 as it updates a current demand spreadsheet 600 shown in FIG. 6 and maintained in memory 102 for the power supply. The spreadsheet contains an entry for each communications device and each port card associated with the port carrier 122. In FIG. 6, the subscript j is used as an index for each communications device where j=1 to J and the subscript m is used as an index for each port card where m=1 to M. The updating is performed whenever the status, i.e., off-hook, on-hook or unplugged, of a communications device 113 changes. For communications devices that draw power when on-hook, the spreadsheet will always indicate a load, unless the associated port card notifies that the communications device is unplugged.

As shown in FIG. 7, call processor 101 performs a port control bus 108 activity scan, as indicated by operation 701, wherein each port card μP 115 is queried for any changes in the status of all its associated communications devices. Each port card μP responds to this inquiry in operation 702 via port control bus 108 indicating the changed status of any associated communications device. In operation 703, the call processor, using the information in device management form 400 and device power form 500 computes the total demanded current (TDI); where $$TDI = \sum_{m=1}^{M} PC_m \sum_{j=1}^{j=J} P_j \qquad (4)$$

and where $PC_m$ indicates a port card which interfaces communications devices 113 and the subscript index m, indicating one of such port cards, goes from 1 to M; and $P_j$ indicates the power consumed by the $j^{th}$ communications device on any given port card, $PC_m$, and j is an index that goes from 1 to J. Note that J is an integer that can vary for each port card.

In operation 704, the call processor compares the TDI to the TAI. If the TDI is greater than TAI, then a power supply overload condition is indicated and the call processor will send a "shed load" port control bus signal (and set a software variable "shed active" to 1) to all the associated port card μPs via the port control bus. In response to this message, each port card will shed load by either reducing the current demand of off-hook communications devices to a predetermined level, or by disconnecting power to on-hook communication devices, or both. If operation 704 indicates that TDI is not greater than TAI and the "shed active" variable =0 in operation 706, the call processor returns to activity scanning operation 701. If, however, the "shed active" variable =1, then in operation 707 normal powering is restored via a "normal power" control message on port control bus 108 to all port card μPs and the shed active variable is reset to zero before operation 701 is resumed.

It should, of course, be noted that while the present invention has been described in terms of various illustrative embodiments, other arrangements will be apparent to those of ordinary skill in the art. For example, while the present invention has been disclosed in reference to a particular communications system, it should be apparent to those of ordinary skill in the art that the present invention, while advantageous for a variety of different types of communications systems, can be used in other power supply applications as well. For example, the present invention is applicable to situations where one or more power-consuming loads have different modes of operation, each requiring a different power demand, and load shedding is performed by apparatus external to the power supply. In addition, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. Accordingly, the voltage drop detector 114 of FIG. 1 can be replaced by a voltage detector which operates in combination with a microprocessor, such as μP 115, to function as a voltage drop detector.

What is claimed is:

1. Automatic power supply load shedding apparatus for reducing the power demand of a power supply of a communication system which feeds at least one load, said load including at least one communications device which is connected to said power supply via an interface circuit, the power consumption of said load varying with each of a plurality of operational modes, said apparatus comprising
    means for determining the power output demand of said power supply by tracking the activity states of said communications device in said load, said activity states including on-hook and off-hook; and means in said load responsive to said determined demand for altering the operational mode of said load so as to reduce the power demand of said supply.

2. The apparatus of claim 1 wherein said altering means includes a processor which directs a battery feed circuit to alter current supplied to said communications device.

3. The apparatus of claim 1 wherein said determining means is a processor which monitors a battery feed circuit in said interface circuit and determines the power output demand therefrom.

4. The apparatus of claim 1 wherein said determining means includes a voltage detector which monitors an output voltage of said power supply.

5. The apparatus of claim 4 wherein said voltage detector is located in said interface circuit.

6. The apparatus of claim 1 wherein said determining means is a processor located in a central control complex of said communication system and is connected to said load via a bus.

7. The apparatus of claim 6 wherein said processor tracks the activity states of said communications device in said load.

8. The apparatus of claim 6 wherein said processor tracks an inoperative or unplugged activity state of said communications device in said load.

9. The apparatus of claim 1 wherein said determining means is responsive to an over-current signal coupled by said power supply.

10. A method of automatically shedding the output power demand of a power supply in a communication system which feeds at least one load, said load including at least one communications device which is connected to said power supply via an interface circuit, the power consumption of said load varying with each of a plurality of operational modes, said method comprising the steps of determining the power output deman of said power supply by tracking the activity states of said communications device in said load, said activity states including on-hook and off-hook; and altering the operational mode of said load, in response to the determined demand, using apparatus internal to said load, said operational mode alteration reducing the power demand of said supply.

* * * * *